UNITED STATES PATENT OFFICE.

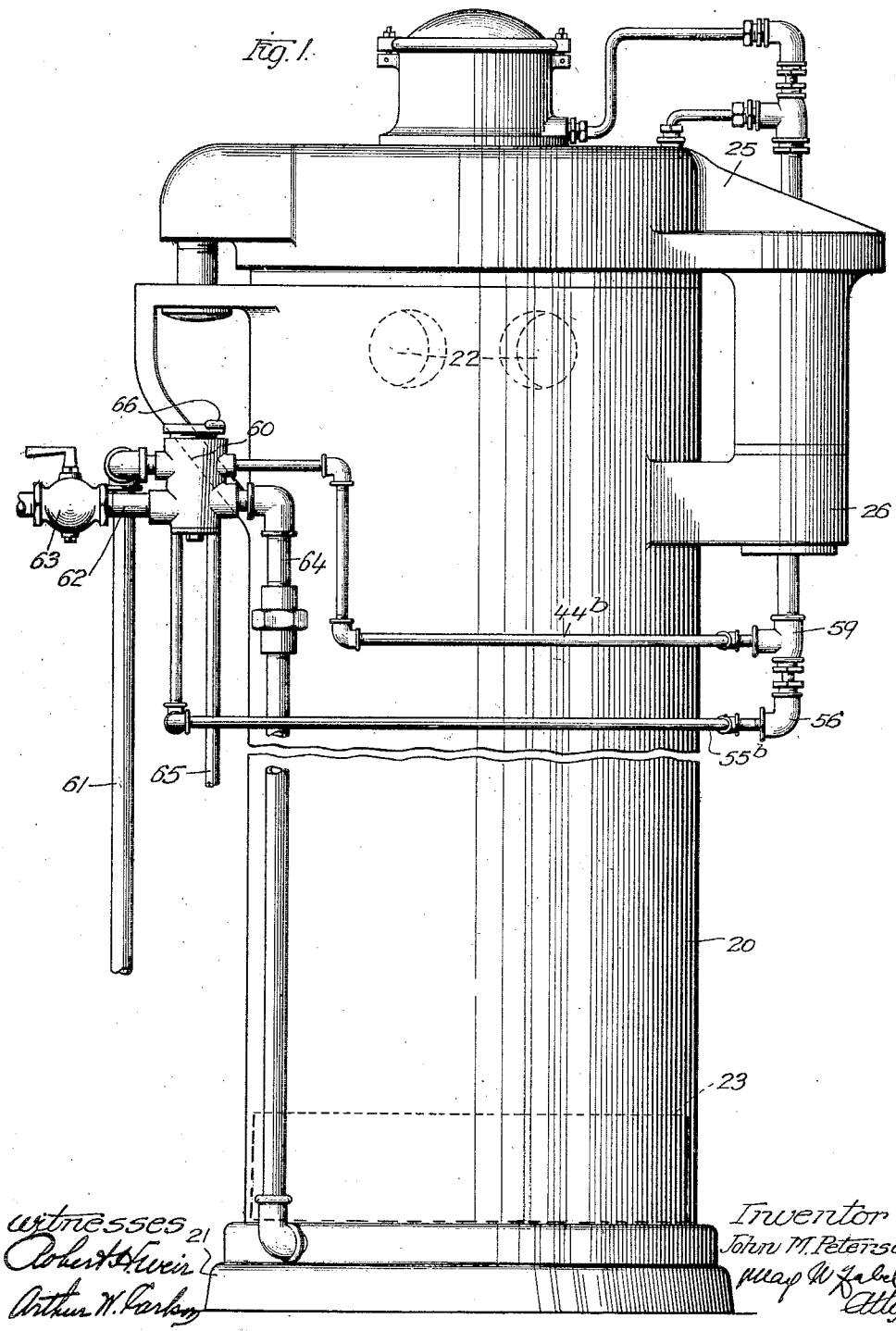

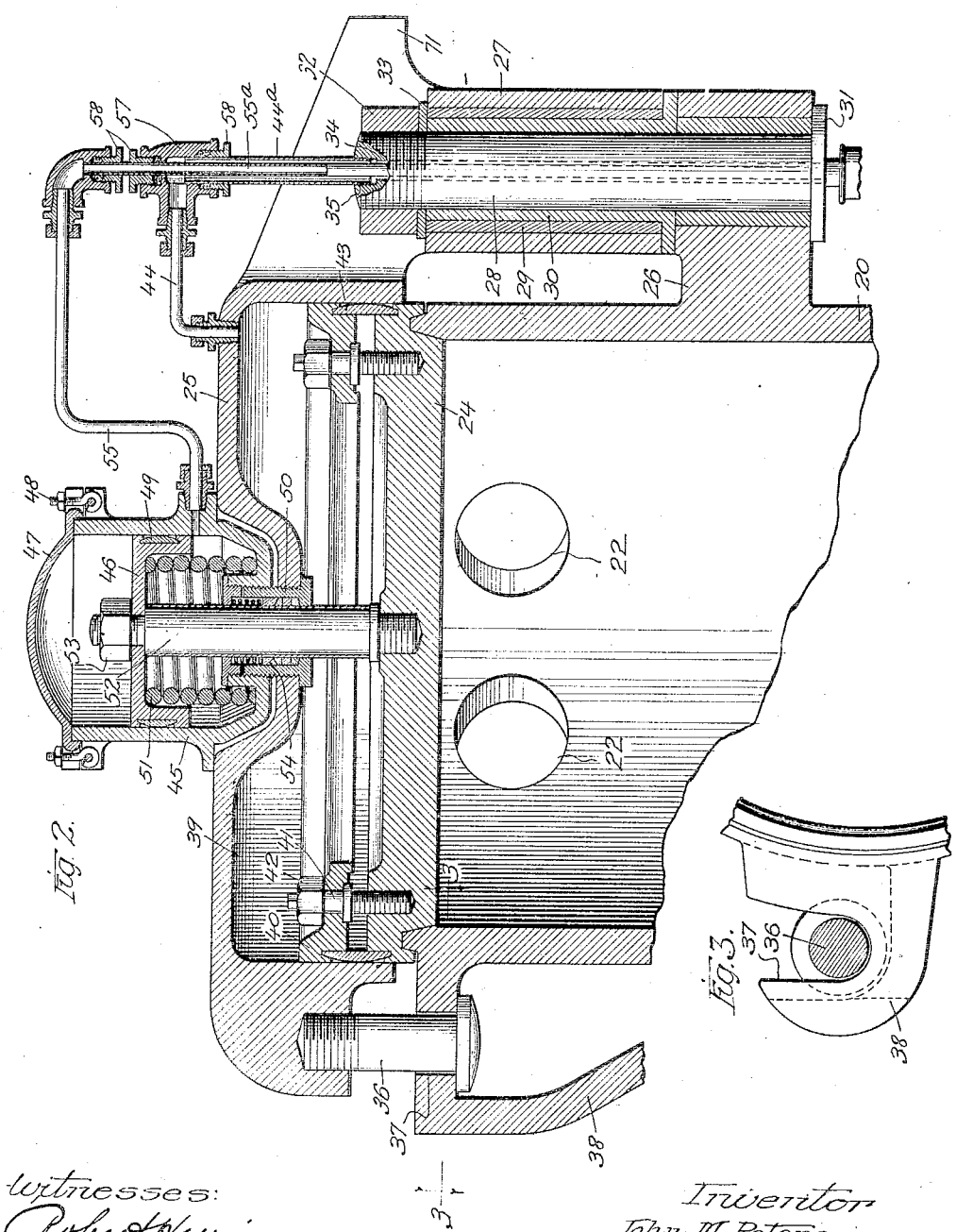

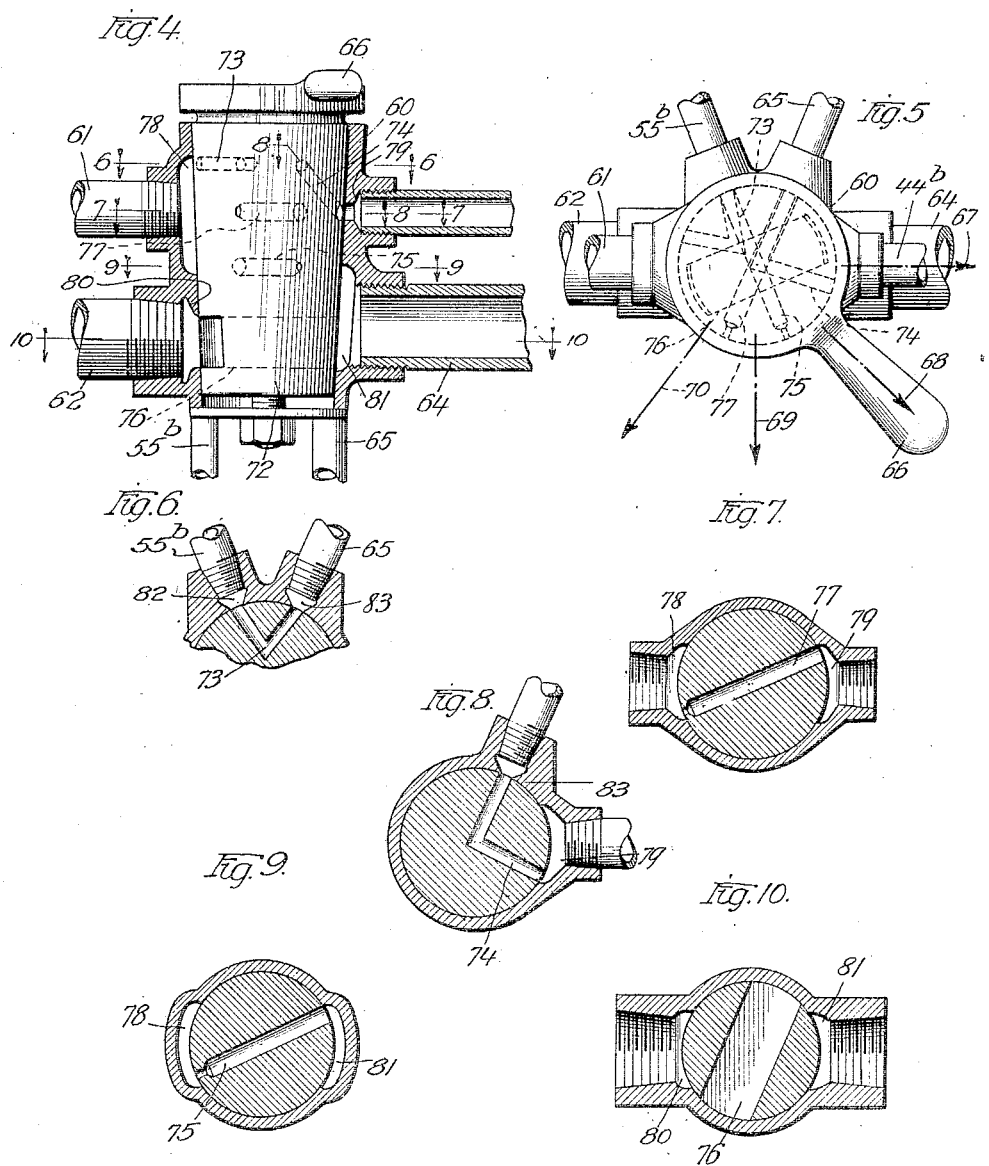

JOHN M. PETERSON, OF CHICAGO, ILLINOIS, ASSIGNOR TO GEORGE JACOB SAYER, OF CHICAGO, ILLINOIS.

STUFFER OR FILLER.

1,309,335.      Specification of Letters Patent.      Patented July 8, 1919.

Application filed December 22, 1917. Serial No. 208,411.

*To all whom it may concern:*

Be it known that I, JOHN M. PETERSON, a citizen of the United States, residing at Chicago, in the county of Cook and State of Illinois, have invented a certain new and useful Improvement in Stuffers or Fillers, of which the following is a full, clear, concise, and exact description, reference being had to the accompanying drawings, forming a part of this specification.

My invention relates to sausage stuffers or similar devices and has for its object the provision of an improvement on a device illustrated in my United States Letters Patent No. 1,234,935, issued July 31, 1917.

In my said prior patent I illustrate as a specific form of carrying out my invention a sausage stuffer in which suitable means are provided whereby the cylinder head is initially locked in position before pressure is supplied to the cylinder. The application of pressure to the cylinder operates the floating piston to press out the sausage material with which the cylinder is filled. The object of the locking appliances for the cylinder head is to guard against breakage of the apparatus due to an improperly locked cylinder head. In my said patent mechanical locking means pneumatically controlled are employed to bring about the result.

In my present invention I mount the cylinder head removably in a rotatable framework and apply pneumatic pressure directly to the cylinder head to hold it in position.

I will describe this form of carrying out my invention more in detail by referring to the accompanying drawings, in which—

Figure 1 is a side view of a sausage stuffer constructed in accordance with my invention;

Fig. 2 is a fragmentary longitudinal sectional view of the cylinder head mechanism;

Fig. 3 is a sectional view on line 3—3 of Fig. 2;

Fig. 4 is a side view partly in section of the valve mechanism;

Fig. 5 is a top view thereof;

Fig. 6 is a sectional view on line 6—6 of Fig. 4;

Fig. 7 is a sectional view on line 7—7 of Fig. 4;

Fig. 8 is a sectional view on line 8—8 of Fig. 4;

Fig. 9 is a sectional view on line 9—9 of Fig. 4, and

Fig. 10 is a sectional view on line 10—10 of Fig. 4.

Referring more particularly to Figs. 1, 2 and 3, I show a sausage stuffer having a cylinder 20 mounted on a suitable base 21, the cylinder being hollow as shown more clearly in Fig. 2, and having at its top an outlet tube or tubes 22, through which the sausage is forced from the interior of the cylinder by the floating piston 23. The cylinder is adapted to be closed at the top periodically by means of the cylinder head 24. This cylinder head is carried by a framework 25 rotatably carried upon the projecting bracket 26. Whenever the cylinder head is elevated within the framework 25 so as to clear the top wall of the cylinder, then the framework together with the cylinder may be swung about their pivotal mounting, as will presently appear, in order to permit filling the cylinder with sausage meat. The framework 25 has a downwardly extending bearing section 27 which is held in place upon the bracket 26 through the agency of the bolt 28, certain bushings 29 and 30 being interposed for mechanical reasons as well understood. The bolt has a circular flange 31 at its lower extremity which abuts the bracket 26 and has at its upper extremity a nut 32 which holds the parts together, a washer 33 being interposed. The bolt is hollow having the bore 34 for purposes that will presently appear, the opposite extremities of the bore being widened and being internally screw threaded as shown at 35.

The object of thus constructing the bolt is to permit of the passage therethrough of two tubes or channels through which two independent passageways are provided toward the cylinder head and framework, the construction being necessitated by the pivotal mounting of the cylinder head and framework, all as will presently appear.

The cylinder head has at its side opposite to the bearing section 27 a bolt 36 which coöperates with a bayonet slot 37 formed within the protruding bracket 38. Whenever the cylinder head is swung into the position shown in Figs. 1 and 2 the thread of the bolt coöperates with the bayonet slot to hold the framework 25 in position so that when pneumatic pressure is applied to force the cylinder head 24 downwardly the parts are retained in their proper relationship. Whenever the cylinder head is elevated above the upper wall of the cylinder, then the construction of course readily permits the framework 25 to swing as no obstruction is offered the bolt 36 swinging out of the bayonet slot 37. The framework 25 forms a hollow auxiliary piston chamber or cylinder head 39 having a circular wall so that the cylinder head may slide up and down within this piston chamber 39. The cylinder head is provided with an annular ring 40, adjustably secured to the cylinder head by means of the bolt 41 and nut 42. A spring pressure packing 43 is interposed between the parts 24 and 40 to avoid leakage of fluid under pressure from the piston chamber 39. A tube 44 is adapted to conduct fluid toward and away from the piston chamber 39. The framework 25 also carries a second piston chamber 45 within which the piston 46 operates. A suitable head 47 is held in place by the bolts 48. The piston 46 is provided with suitable packing 49 as apparent from the illustration. The chamber 45 is held in position on the framework by being screw threadedly attached to the annular cup 50. A spring 51 normally tends to push the piston 46 upwardly, thus carrying with it the cylinder head 24 as these two parts are held together by the bolt 52 having at its extremity the nut 53. Suitable packing 54 is provided for the bolt 52 so as to provide a non-leaking sliding mounting for said bolt. A pipe or tube 55 supplies pressure to the chamber on the under side of the piston 46 or withdraws it therefrom as will presently appear. Thus, if pressure is supplied to the piston chamber 39 the cylinder head 24 is forced downwardly on top of the cylinder 20 to close it. Pressure is always maintained in this chamber whenever it is desired to keep the cylinder head in position. A suitable valve structure presently to be explained controls this action. Whenever it is desired to remove the cylinder head, then the pressure is exhausted from the chamber 39 and is applied underneath the piston 46 to the chamber 45, whereupon the cylinder head is raised.

When no pressure is applied to either chamber 45 or 39, then the spring 51 would normally keep the cylinder head elevated above the top line of the cylinder.

Now, in order to maintain separation of the pipes 44 and 45 as they pass through the pivotal mounting of the framework 25, I provide an annular pipe 44$^a$ about the pipe 55$^a$ and connect this pipe 44$^a$ with the pipe 44 through the agency of the union 57, as readily apparent. Suitable stuffing boxes 58 are provided to permit rotation of the framework without rotating the pipe 44$^a$ or the pipe 55$^a$. The pipe 55$^a$ extends all the way through the hollow interior of the bolt 28, whereas the encircling pipe 44$^a$ is screw threaded at 35 into the bore of this bolt so that the bore of the bolt about the pipe 55$^a$ furnishes the continuation for the pipe 44. A similar construction consisting of the union 59 and the angle 56 maintain a separation of the parts 55$^b$ and 44$^b$ which are respectively continuations of the pipes 55 and 44. Thus these two pipes 44 and 55 form separate passageways through the pivotal mounting of the frame 25. These pipes 44$^b$ and 55$^b$ then lead directly into the valve mechanism 60. A pipe 61 also leads into this valve mechanism having its origin at a suitable source of pressure supply. A further pipe 62 which may be controlled by a valve 63 is an exhaust pipe leading from the valve mechanism 60. A further pipe 64 leads from the valve mechanism directly into the cylinder 20 to furnish pressure thereto or withdraw it therefrom as the case may be. A further pipe 65 leads from the valve chamber 60 to conduct away the exhaust from the chamber 45. The operation of the device then contemplates that the valve mechanism as controlled by the handle 66 may be moved into four different positions indicated respectively by the arrows 67, 68, 69 and 70.

The position indicated by the arrow 68 is the normal position of the handle 66. In this position pressure is supplied to the chamber 45 to keep the cylinder head 24 elevated. The first forward position is indicated by the arrow 69, in which position of the valve handle fluid is exhausted from the chamber 45 and fluid under pressure supplied to the piston chamber 39 to lower the cylinder head 24 into its locking position. The next position of the handle in the position of the arrow 70 maintains pressure within the chamber 39 and also supplies pressure to the cylinder 20 to gradually force the piston 23 upwardly to gradually expel the sausage meat. Should the handle 66 be moved from its normal position, as indicated by the arrow 68 into the position of the arrow 67, then pressure is supplied only to the cylinder 20 and this occurs only in a special case when it is desired to force the floating piston 23 upwardly out of its cylinder, the framework 25 and cylinder head 24 being in that instance swung around out of alinement with the cylinder 20.

Suitable safeguards such as outlined in my aforesaid patent can be used to prevent moving the handle 66 into the position shown by the arrow 67 unless supplemental locking facilities have been actuated by the operator. The framework likewise has a lug 71 which prevents the piston 23 from leaving the cylinder as this lug 71 overhangs the cylinder in every position of the framework except in one particular given position as set forth in my prior patent.

I will now describe more particularly in connection with Figs. 4 to 10 inclusive the various features involved in the construction of the valve mechanism 60 through the agency of which the inlet and exhaust of the fluid to the various fluid chambers heretofore alluded to is effected and controlled. The valve spindle 72 is rotatably mounted within the valve casing 60 and moves with the handle 66. This valve spindle has five ducts, respectively the ducts 73, 74, 75, 76 and 77. The tube 61 is in association with an enlarged port 78. The tube 44$^b$ is in association with a port 79. The pipe 62 is in association with a port 80, the pipe 64 is in association with a port 81, the pipe 55$^b$ is in association with a port 82, and the pipe 65 is in association with a port 83.

Fig. 6 shows the valve structure in the position where the fluid under pressure is being exhausted from the chamber 45 and the valve would occupy this position whenever the handle 66 is alined with the arrow 69.

The section shown in Fig. 8 represents the valve structure with the handle 66 alined with the arrow 68. The section of Fig. 10 represents the handle 66 alined with the arrow 67 and the section of Fig. 7 shows the valve structure with the handle 66 alined with the arrow 69. And the section of Fig. 9 shows air being transmitted to the main cylinder 20, the valve handle under that condition occupying the position of alinement with the arrow 70.

From these illustrations the cycle of operations of the valve will be readily clear from what has been described as occurring during the various positions of the valve spindle 72. In the neutral position of the valve, that is, in the position of the arrow 68, fluid under pressure passes through the ducts 73 to the piston chamber 45. The main cylinder is exhausting through the duct 76 and the piston chamber 39 is exhausting through the duct 74. If the valve handle be moved to the position 67 no change takes place as to the piston chambers 39 and 45, but air is supplied through the duct 75 to the cylinder 20 to force out the piston, the cylinder head 24 in this position being in entire disalinement with the cylinder 20. Should the valve handle be moved into coincidence with the arrow 69, then as shown in Fig. 6 air is exhausted from the chamber 49 but supplied through the duct 77 as shown in Fig. 7 to the piston chamber 39 to lock the cylinder head. A further movement of the handle 66 to the position of arrow 70 maintains connection of the piston chamber 39 with the pressure port 78, but at the same time permits air under pressure to be supplied through the duct 75 to the main cylinder 20. The operations of the duct 76 to exhaust from the main cylinder will be readily understood. It is thus seen that the valve structure automatically controls means not only for operating the floating piston, but also for controlling the locking of the cover and the unlocking thereof.

The interlocking instrumentalities whereby the handle 66 can only in special cases be moved into coincidence with the arrow 67 as shown in my prior patent are of course equally applicable to this present structure. Likewise, the coöperating effect of the lug 71 to prevent entire removal of the floating piston 23, as stated in my aforesaid patent, is also part of this present structure. Furthermore, the entire locking instrumentalities as shown in my prior patent whereby the cylinder head must be in actual coincidence with the cylinder 20 before the handle 66 may be moved toward the arrow positions 69 and 70, all as shown in my prior patent, are of course also contemplated for use herein, although not specifically described as they are set forth in said patent and claimed therein.

In using the term "pneumatic pressure" in the claims, I of course, mean this to include its equivalents such for instance as hydraulic pressure.

The description thus given of my improved means for carrying out the general principles outlined in my said patent will be readily clear to those skilled in the art. I have thus described one embodiment which this improved form may take, and claim as my invention the following:

1. A device of the character described comprising a main cylinder, a pneumatically actuable removable cylinder head therefor, a source of pressure supply, and means for controlling the association of said source of pressure with said main cylinder and controlling the actuation of said cylinder head both into its cylinder closing and cylinder opening positions.

2. A device of the character described comprising a main cylinder, a pneumatically actuable removable cylinder head therefor, a source of pressure supply, means for controlling the association of said source of pressure with said main cylinder and controlling the actuation of said cylinder head, a rotatable framework for carrying said cylinder head, and means operable irrespective of the angular position of said framework to conduct fluid toward said framework.

3. A device of the character described comprising a main cylinder, a pneumatically actuable removable cylinder head therefor, a source of pressure supply, means for controlling the association of said source of pressure with said main cylinder and controlling the actuation of said cylinder head both into its cylinder closing and cylinder opening positions, and means operable irrespective of the angular position of said framework to conduct fluid toward said framework.

4. A device of the character described comprising a main cylinder, a pneumatically actuable removable cylinder head therefor, a piston chamber to control the pneumatic actuation of said cylinder head, a source of pressure supply, and means for controlling the association of said source of pressure with said main cylinder and controlling the actuation of said cylinder head.

5. A device of the character described comprising a main cylinder, a pneumatically actuable removable cylinder head therefor, a piston chamber to control the pneumatic actuation of said cylinder head, a source of pressure supply, and means for controlling the association of said source of pressure with said main cylinder and controlling the actuation of said cylinder head both into its cylinder closing and cylinder opening positions.

6. A device of the character described comprising a main cylinder, a pneumatically actuable removable cylinder head therefor, a piston chamber to control the pneumatic actuation of said cylinder head, a source of pressure supply, means for controlling the association of said source of pressure with said main cylinder and controlling the actuation of said cylinder head, a rotatable framework for carrying said cylinder head, and means operable irrespective of the angular position of said framework to conduct fluid toward said framework.

7. A device of the character described comprising a main cylinder, a pneumatically actuable removable cylinder head therefor, a piston chamber to control the pneumatic actuation of said cylinder head a source of pressure supply, means for controlling the association of said source of pressure with said main cylinder and controlling the actuation of said cylinder head both into its cylinder closing and cylinder opening positions, and means operable irrespective of the angular position of said framework to conduct fluid toward said framework.

8. A device of the character described comprising a main cylinder, a pneumatically actuable removable cylinder head therefor, a piston chamber for controlling the pneumatic actuation of said cylinder head in one direction, a second pneumatic chamber for controlling the pneumatic actuation of said cylinder head in the opposite direction, a source of pressure supply, and means for controlling the association of said source of pressure with said main cylinder and controlling the actuation of said cylinder head.

9. A device of the character described comprising a main cylinder, a pneumatically actuable removable cylinder head therefor, a piston chamber for controlling the pneumatic actuation of said cylinder head in one direction, a second pneumatic chamber for controlling the pneumatic actuation of said cylinder head in the opposite direction, a source of pressure supply, and means for controlling the association of said source of pressure with said main cylinder and controlling the actuation of said cylinder head both into its cylinder closing and cylinder opening positions.

10. A device of the character described comprising a main cylinder, a pneumatically actuable removable cylinder head therefor, a piston chamber for controlling the pneumatic actuation of said cylinder head in one direction, a second pneumatic chamber for controlling the pneumatic actuation of said cylinder head in the opposite direction, a source of pressure supply, means for controlling the association of said source of pressure with said main cylinder and controlling the actuation of said cylinder head, a rotatable framework for carrying said cylinder head, and means operable irrespective of the angular position of said framework to conduct fluid toward said framework.

11. A device of the character described comprising a main cylinder, a pneumatically actuable removable cylinder head therefor, a piston chamber for controlling the pneumatic actuation of said cylinder head in one direction, a second pneumatic chamber for controlling the pneumatic actuation of said cylinder head in the opposite direction, a source of pressure supply, means for controlling the association of said source of pressure with said main cylinder and controlling the actuation of said cylinder head both into its cylinder closing and cylinder opening positions, and means operable irrespective of the angular position of said framework to conduct fluid toward said framework.

12. A device of the character described comprising a main cylinder, a removable cylinder head therefor, means whereby said cylinder head is directly movable through the application of pneumatic pressure, a source of pressure supply, and means for controlling the association of said source of pressure supply with said main cylinder and controlling the actuation of said cylinder head.

13. A device of the character described comprising a main cylinder, a removable cylinder head therefor, a framework for carrying said cylinder head, a pneumatic chamber carried by said framework, a source of pressure supply, and means for controlling the association of said source of pressure with said main cylinder and with said pneumatic chamber to thereby control the actuations of said cylinder head.

In witness whereof, I hereunto subscribe my name this 17th day of December, A. D., 1917.

JOHN M. PETERSON.

Copies of this patent may be obtained for five cents each, by addressing the "Commissioner of Patents, Washington, D. C."